United States Patent
Heying

(10) Patent No.: US 6,581,701 B2
(45) Date of Patent: Jun. 24, 2003

(54) METHODS FOR REDUCING LOST CIRCULATION IN WELLBORES

(75) Inventor: Theodore L. Heying, Northford, CT (US)

(73) Assignee: Broadleaf Industries Inc., Costa Mesa, CA (US)

( * ) Notice: Subject to any disclaimer, the term of this patent is extended or adjusted under 35 U.S.C. 154(b) by 27 days.

(21) Appl. No.: 09/882,013

(22) Filed: Jun. 14, 2001

(65) Prior Publication Data

US 2002/0040812 A1 Apr. 11, 2002

Related U.S. Application Data

(63) Continuation-in-part of application No. 09/542,416, filed on Apr. 4, 2000, now abandoned.
(60) Provisional application No. 60/134,262, filed on May 14, 1999.

(51) Int. Cl.[7] .......................... C09K 7/02; E21B 21/00; E21B 33/138
(52) U.S. Cl. .................... 175/72; 166/294; 166/295; 166/300; 507/104; 507/120; 507/140; 507/204; 507/225; 507/269; 523/130
(58) Field of Search ................. 166/281, 294, 166/295, 300; 175/72; 507/104, 120, 140, 204, 225, 269, 903; 523/130

(56) References Cited

U.S. PATENT DOCUMENTS

| | | | |
|---|---|---|---|
| 3,208,524 A | | 9/1965 | Horner et al. |
| 3,818,998 A | | 6/1974 | Hessert |
| 4,182,417 A | * | 1/1980 | McDonald et al. ......... 166/295 |
| 4,282,928 A | | 8/1981 | McDonald et al. |
| 4,422,948 A | | 12/1983 | Corley et al. |
| 4,635,726 A | * | 1/1987 | Walker ....................... 166/294 |
| 4,670,501 A | | 6/1987 | Dymond et al. |
| 5,147,852 A | * | 9/1992 | Cowan et al. ................. 175/72 |
| 5,439,057 A | * | 8/1995 | Weaver et al. ............... 166/283 |
| 5,680,900 A | | 10/1997 | Nguyen et al. |
| 5,735,349 A | * | 4/1998 | Dawson et al. ............. 166/294 |

OTHER PUBLICATIONS

International Search Report, Dated: Jun. 22, 2001, 5 Pages.

* cited by examiner

Primary Examiner—George Suchfield

(57) ABSTRACT

This invention discloses methods for reducing lost circulation in wellbores. The invention utilizes certain selected water swellable polymers that swell at a rate slow enough to reach the lost circulation zone of a well before those polymers have swollen to an extent that disrupts the drilling process. These selected polymers may be used alone or in conjunction with other lost circulation materials which do not swell or also swell slowly enough to reach the lost circulation zone without interfering with the drilling operation. Mixtures of such materials are also disclosed.

5 Claims, No Drawings

METHODS FOR REDUCING LOST CIRCULATION IN WELLBORES

This application is a Continuation in Part of application Ser. No. 09/542,416 filed on Apr. 4, 2000 now abandoned and this application claims benefit of provisional application Ser. No. 60/134,262, filed on May 14, 1999.

BACKGROUND-FIELD OF INVENTION

This invention concerns the use of specially crosslinked polyacrylamide, water absorbing polymers for reducing lost circulation when aqueous drilling fluids are used and a method for reducing such lost circulation. These polymers are able to reach various levels of areas of fissures and thief zones before absorbing enough water and to expand to plug those fissures and thief zones.

BACKGROUND

Drilling fluids or drilling muds as they are sometimes called, are slurries of solids used in the drilling of wells in the earth for the purpose of recovering hydrocarbons and other fluid materials. Drilling fluids have a number of functions, the most important of which are lubricating the drilling tool and drill pipe which carries the tool, removing formation cuttings from the well, counterbalancing formation pressures to prevent the inflow of gas, oil or water from permeable rocks which may be encountered at various levels as drilling continues, and holding the cuttings in suspension in the event of a shutdown in the drilling and the pumping of the drilling fluid.

For a drilling fluid to perform these functions and allow drilling to continue, the drilling fluid must stay in the borehole. Frequently, undesirable formation conditions are encountered in which substantial amounts or, in some cases, practically all of the drilling fluid may be lost into the formation. Drilling fluid can leave the borehole through large or small fissures or fractures in the formation or through pores in the rock matrix surrounding the borehole.

Most wells are drilled with the intent of forming a filter cake of varying thickness on the sides of the borehole. The primary purpose of the filter cake is to reduce the large losses of drilling fluid to the surrounding formation. Unfortunately, formation conditions frequently are encountered which may result in unacceptable losses of drilling fluid to the surrounding formation despite the type of drilling fluid employed and filter cake established.

A variety of different substances are often pumped down well bores in attempts to reduce the large losses of drilling fluid to fractures and the like in the surrounding formation. Different forms of cellulose are preferred materials by some persons. Other substances which are pumped into well bores to control lost circulation are: almond hulls, black walnut hulls, bagasse, dried tumbleweed, kenaf, paper, coarse and fine rice. These and a number of other prior art materials are described in U.S. Pat. No. 4,498,995.

Another process that is employed to close off large lost circulation areas is referred to in the art as gunk-squeeze. In that process, a quantity of a powdered bentonite is mixed into diesel oil and pumped down the well bore. Water injection follows and the water and bentonite will harden to form a gunky, semi-solid mass which can reduce lost circulation. This process must be carefully controlled; first the bentonite must be kept dry until it reaches the desired location in the well and then problems frequently occur in trying to mix the bentonite and water in the well. This method is disclosed in U.S. Pat. No. 3,082,823.

Many of the methods devised or proposed to limit lost circulation involve the use of water expandable materials. The black walnut hulls and other nut hulls have been found to undergo some swelling when used in this operation. (see Glowka et al, Journal of Petroleum Technology, March 1990, pages 328 & ff.) Cremeans in U.S. Pat. No. 4,217,965 teaches the use of compressed, swellable, pelletized cottonseed hulls in combination with cottonseed meal, bentonite, residual lint and a surface active agent. The advantage of this compressed material is that it does not expand quickly when added to the drilling fluid but only after it is well down the well bore.

Another swellable material sometimes used is a water expandable clay such as bentonite which may be mixed with another ingredient to form a viscous paste or cement. U.S. Pat. No. 2,890,169 discloses a lost circulation fluid made by forming a slurry of bentonite and cement in oil. The slurry is mixed with a surfactant and water to form a composition comprising a water-in-oil emulsion having the bentonite and cement dispersed in the continuous oil phase. As this composition is pumped down the well bore, the oil expands and flocculates the bentonite which, under the right conditions, forms a cake on the wellbore surface in the lost circulation area. Hopefully, the settling of the cake of the walls will cause the emulsion to break thus causing the previously emulsified water to react with the cement to form a solid coating on the cake. But such a complex process can easily go wrong.

U.S. Pat. No. 3,448,800 discloses another method wherein a water soluble polymer is slurried in a non-aqueous medium and injected into a well. Another slurry of a mineral material such a barite, cement or plaster of paris is subsequently injected into the well to mix with the first slurry to form a cement-like plug in the wellbore.

U.S. Pat. No. 4,261,422 describes the use of an expandable clay such as bentonite or montmorillonite which is dispersed in a liquid hydrocarbon into the well. After injection the clay will expand on contact with water in the formation. Thus it is hoped that the expanding clay will close off water producing intervals, but not harm oil producing intervals.

A similar method is disclosed in U.S. Pat. No. 3,078,920 which uses a solution of a polymerized methacrylate dissolved in a non-aqueous solvent such as acetic acid, acetic anhydride, propionic acid and liquid aliphatic ketones such as acetone or methyl-ethyl ketone. The methacrylate will expand on contact with formation water in the water producing formations in the well.

It has also been proposed to mix bentonite with water in the presence of a water soluble polymer which will flocculate and congeal the clay to form a much stronger and stiffer cement-like plug than will form when bentonite is mixed with water alone. U.S. Pat. No. 3,909,421 discloses such a fluid made by blending a dry powdered polyacrylamide with bentonite followed by mixing the powder blend with water. U.S. Pat. No. 4,128,528 claims a powdered bentonite/polyacrylamide thickening composition prepared by mixing a water-in-oil emulsion with bentonite to form a powdered composition which rapidly becomes a viscous, stiff material when mixed with water. U.S. Pat. Nos. 4,503,170; 4,457,594; 4,445,576; 4,442,241; and 4,391,925 teach the use of a water expandable clay dispersed in the oily phase of a water-in-oil emulsion containing a surfactant to stabilize the emulsion and a polymer dispersed in the aqueous phase. When the emulsion is sheared, it breaks and a bentonite paste is formed which hardens into a cement-like plug. The patent discloses the use of such polymers as polyacrylamide, polyethylene oxide and copolymers of acrylamide and acrylic or methylacrylic acid.

U.S. Pat. No. 4,124,748 discloses a cross-linked copolymer of a vinyl ester and an ethylenically unsaturated carboxylic acid or derivative thereof that can absorb about 200 to 800% of its weight in water and expand substantially in volume when doing so. U.S. Pat. No. 3,997,484 is typical of a group of related patents by Fanta, Doane and co-workers at the USDA Northern Regional Laboratory which describe various water swellable polymers made by grafting acrylonitrile onto starch and then hydrolyzing the resultant copolymers. These polymers are capable of absorbing large amounts of water very rapidly with the concomitant swelling have been used in a specific form as lost circulation materials as described below. The rights to use these patents have been granted to several companies and some are commercially available. Advances on this technology have been regularly made to the present time. For example, U.S. Pat. No. 5,065,822 teaches the use of a polyvalent metal such as iron which is formed as the ingredients are passing down the borehole to contact a previously placed starch hybrid polymer, thus crosslinking the polymer to make the polymer formation impermeable.

Another highly water absorbent copolymer which expands upon water absorption is described in U.S. Pat. No. 4,320,040. The described compound is derived by polymerizing acrylic acid and/or methacrylic acid in the presence of polyvinyl alcohol followed by neutralization and a heat treatment.

Highly absorbent spongy polymers which may absorb large quantities of water and hydrocarbons causing an increase in volume are disclosed in U.S. Pat. No. 3,878,175. These are copolymers of an acyl acrylate and a heterocyclic N-vinyl monomer containing a carbonyl functionality and a crosslinking agent in the presence of a hydrophobic liquid diluent. U.S. Pat. No. 4,182,677 discloses that natural and synthetic rubbers will also swell in size upon absorbing water.

Many of the approaches mentioned here and later have used crosslinked polyacrylamides as the water absorbing polymer. One of the first disclosures of such materials in U.S. Pat. 3,247,171 which teaches the preparation and then hydrolysis of a crosslinked polacrylamide polymer. Variations in method of polymerization as well as the type and depth of hydrolysis were shown to vary the properties of the products such as rate of absorption or water and propensity to retain the water absorbed. Many variations of that theme have been subsequently reported with U.S. Pat. No. 4,559,074 being quite notable. This mildly ionic crosslinked polyacrylamide has a high water absorbtivity, retains the water well and can be manufactured reproducibly.

Much research has been dedicated to the use of encapsulants and methods to produce encapsulated products of various types. Although this is typical of the pharmaceutical and cosmetic field, the use of encapsulated materials to provide useful, swellable lost circulation materials have not been overlooked. This technique is sometimes useful in preventing the swelling of water absorbing polymers and other materials prior to their reaching the thief zone or otherwise interfering with the drilling operation itself.

An invention using encapsulation of materials for use in boreholes is described in U.S. Pat. No. 4,078,612. The patent describes an explodable material encapsulated in natural gums slurried in a liquid vehicle. The material is pumped into the formation around the wellbore and exploded to decrease permeability.

The use of bentonite encapsulated within a water insoluble polymeric coating within a water-insoluble polymeric coating has been disclosed for lost circulation control. U.S. Pat. No. 2,836,555 describes bentonite encapsulated within a polymeric coating having a tiny hole drilled therethrough. When the encapsulated bentonite is pumped down the wellbore, water will seep through the hole in the encapsulant causing the bentonite to swell and ultimately rupture the coating.

Another U.S. Pat. No. 4,036,301 describes an encapsulated material useful in cementing a well, wherein a cement accelerator is encapsulated in a waxy material and placed within a highly retarded cement slurry. The cement slurry is pumped into the well with the encapsulated accelerator. After proper placement of the cement, circulation is decreased so that the temperature of the cement fluid approaches the bottom hole temperature of the well and melts the encapsulated material, freeing the accelerator which sets the cement.

A similar technique is disclosed in U.S. Pat. No. 4,362,566 which suggests encapsulating one component of a two or more component adhesive of cement mixture so that hardening will not start until the encapsulated component is freed from its reaction-preventing casing.

Similarly, U.S. Pat. No. 4,664,8116 teaches introducing a water absorbent polymer encapsulated by a selected waxy substance which prevents the polymer from expanding by absorbing water until it reaches the lost circulation zone. This encapsulation material then dissolves or melts at the desired temperature within the borehole, thereby releasing the water absorbent polymer to absorb water and expand to seal the lost circulation zone.

Each of the above discussed methods has sufficient disadvantages making it necessary to continue the search for an effective, efficient and readily controlled method of reducing or eliminating lost circulation without undue interruption of the drilling process. The methods mentioned generally go to great lengths to prevent the swollen lost circulation material from being finally generated in the drilling zone thereby impeding the flow of the drilling mud or making it so viscous that the drilling becomes inefficient. When some of the materials mentioned above do reach the lost circulation zone they must be somehow activated to absorb water and swell still in the proper region which against difficult to control. In addition some of the materials are difficult or remove when desired and other because of their nature are removed too soon.

In accordance with the method of this present invention, the selected polymers are in granular form which can be readily introduced into the wellbore along with the aqueous drilling fluid and the granules will pass through the wellbore substantially in a non-swollen state. A polymer of suitable particle size can be selected which can proceed down the wellbore to the appropriate depth where a fissure may have occurred. Once in the area of lost circulation the granules can accumulate, absorb water and swell to form a "soft gel", watertight plug thereby sealing the porous formation. In addition the materials can be used in conjunction with other lost circulation materials such as ground walnut shells or other aforementioned swellable or fibrous materials to reinforce the plug or improve the economics of the sealing operation. Finally, the products of this invention are only slowly biodegraded in contrast with starch or cellulose based materials but can be readily removed when desired by the addition of appropriate acids or metallic salts.

OBJECTS AND ADVANTAGES

In accordance with the method of this present invention, the selected polymers are in granular form which can be readily introduced into the wellbore along with the aqueous drilling fluid and the granules will pass through the wellbore substantially in a non-swollen state. Once in the area of lost circulation the granules can accumulate, absorb water and swell to form a "soft gel", watertight plug thereby sealing the porous formation. To accommodate the depth of the thief zone the user can select from among combinations of particle size and chemical structure of the recited polymers. In addition each material can be used in conjunction with other lost circulation materials such as ground walnut shells, compacted cottonseed hulls or other swellable or fibrous materials to reinforce the plug or improve the economics of the sealing operation. Finally, the products are only slowly biodegraded in contrast with starch or cellulose based materials as well as many other readily available polymers. They can be readily removed, however when desired, by the addition of appropriate acid or metallic salt solutions.

Several objects and advantages of this invention are to present simple products and methods for their use as lost circulation materials which may be used in conjunction with on-shore, off-shore, water drilling, coring and geothermal wells for oil and gas. The lost circulation additives discovered are specific, suitably crosslinked polyacrylamides of somewhat similar chemical but important chemical composition and of various particle size distributions which can be added directly to the drilling fluid and thereby be transported to the appropriate depth of the lost circulation area where they will then absorb large quantities of water and swell drastically in the borehole. This swelling substantially closes the fissures and pores through which drilling fluid would be lost. In addition the polymers can be used in conjunction with other swellable or non-swellable lost circulation materials which may also be added to the borehole. The "soft gel" formed by the polyacrylamides can then act alone or in conjunction with the other additives to close any rather large fissures or pores.

Unlike the materials described in Background Section, there is no need to encapsulate, compound, slurry or otherwise pre-treat these lost circulation materials before use. Also there is no need to interrupt or otherwise change the drilling procedure, wait an undue period or depend on the adjustment of the temperature in the borehole for the lost circulation materials to take effect, Still further objects and advantages will become apparent from a consideration of the ensuing description.

GENERAL DESCRIPTION OF THE INVENTION

Crosslinked polyacrylamides became available in the mid-1970's and the polymers made by graft polymerization of acrylonitrile with starch followed by hydrolysis became available about the same time. Many variations in the properties of each could be made by varying the conditions of synthesis. Both classes of polymers found use in various applications where absorption of water is important. A large market developed and still exists for their use in disposable diapers and other similar incontinence products. Another major market which evolved was for their use as soil amendments to retain moisture for grasses, trees, crops and the like which increases the survival rate as well as appearance, crop yield, root structure, etc. Since both classes of copolymers are hydrolyzed from their copolymer precursors, they can be obtained as salts of various anions such as but not limited to sodium, potassium or magnesium and each have unique physical properties.

The physical appearance of the two classes of copolymers as initially prepared is significantly different by nature of the chemical compounds used to synthesize them. The starch graft copolymers are usually fine powders as they leave the manufacturing process but some can be manufactured in flake or film form. The crosslinked polyacrylamide copolymers as manufactured generally appear as semi-crystalline or amorphous clumps of rather large size. These materials then can be ground by various means to the particle size most suited to the application intended. For example the materials described in U.S. Pat. No. 4,559,074 mentioned above can be obtained in various particle sizes and particle size distributions. For example one can obtain the crosslinked polyacrylamide described in this patent from Broadleaf Industries Inc. of Costa Mesa, Calif. in several particle size ranges. The products named Broadleaf P4® can be obtained in the range of 0.50–2.50 millimeters as their standard size, 0.075–0.500 millimeters as their fine size and<0.075 millimeters as the ultra-fine size (often called Root Dip).

More recently Broadleaf Industries Inc. has made available a copolymer of acrylamide and sodium acrylate similarly crosslinked as in the '074 Patent and in the particle size range of ~1.0–5.0 millimeters which is called Broadleaf P4+ and which hydrates at a slower rate than regular P4 thus allowing it to flow further down a borehole before swelling. It could be available in other particle size ranges to suit a given drilling situation. Of course there may be some limit on the size of the given particles depending upon the dimensions of a particular wellbore operation.

It must be realized that similar polymers from other suppliers could be similarly used.

Polymers for use in disposable diapers are required to be able to absorb urine which is primarily water and as rapidly as possible to immobilize the urine as quickly as possible. In addition the ability of such materials to biodegrade in a reasonably short time is also an advantage. The starch graft copolymers are ideal for this application because of their small particle size which hastens the water absorption and the very nature of the starch base itself; starch based materials in general are easily biodegraded. Variations in the rate of absorption of water by commercially available polyacrylamides can be seen in the Examples which follow. The difference in biodegradability is shown by M. S. Johnson, Arab. Gulf J. Scient. Res. 3 (2) 745–750 (1985). Therefore if the starch graft copolymers do get to the borehole properly and do swell there, they can biodegrade rather rapidly and once again open the fissures and pores allowing circulation material to be lost again. Although it is sometimes desirable to remove the caked lost circulation material, the rate and time when this occurs via biodegradation depends on the microbiolgical environment of the borehole which cannot be readily controlled.

Unfortunately the very properties of the starch based copolymers and some crosslinked polyacrylamides which make them ideal for use in disposable diapers make them difficult to use as lost circulation materials. A review of Superabsorbent Polymers, Science and Technology, Bucholz and Peppas, American Chemical Society, 1994 pps. 88–111, clearly shows that the use of such polymers in disposable diapers has driven the technology and the similar development of such materials for other uses such as in agriculture and the drilling industry has been minor. Fortunately Clarke in the U.S. '074 Patent deals with this trend by inventing a crosslinked polyacrylamide specifically designed to have the properties more suitable for the agricultural industry. The careful examination of these materials and their partially hydrolyzed derivatives led to the trial of these products for use as lost circulation materials as described in this invention. When working with the three grades of Broadleaf P4 mentioned above, it was noticed that the finely ground known as Ultra-fine material absorbed water rapidly to form a very viscous slurry which would make it difficult to pump that material to the borehole and for it to congregate there to form a cake. The material designated as Fine forms clumps when first contacting water and requires undue agitation to break apart the clumps so that all of the material will become swollen.

More recently examination of the similarly crosslinked acrylamide/sodium acrylate copolymer led to their trial as Lost Circulation Materials.

Therefore since the very finely divided particles of either type of polymer will absorb water so rapidly from the drilling fluid used to carry them into the borehole, they swell on the way to the borehole. This increases the viscosity of the drilling fluid considerably, or they form agglomerated clumps which also interferes with the movement of the drilling fluid and traps solids from that fluid which, in turn, modifies its characteristics. In addition since the swelling occurrs before settling in the borehole and coating the fissures and voids therein, the swollen copolymer particle can be carried back out of the borehole to the surface and accumulate there. It is for this reason that earlier so much effort was placed on finding encapsulants for the starch based copolymers or otherwise keep them from swelling and the same is true for some other water absorbing polymers, Typical examples of this were described above in U.S. Pat. Nos. 4,664,516 and 4,836,940.

It was therefore determined that the standard Broadleaf P4® or that type of product in larger particle size such as Broadleaf P4+ were most useful for this present invention. The Broadleaf P4+ product can be use advantageously when a fissure at a further distance down a borehole needs to be sealed and this advantage is based on the slightly different chemical composition of the polymer from that of Broadleaf P4 and also the fact that the large particle size presents a larger surface area to the available water thus slowing the absorption of water but not diminishing the total water absorption. Of course other materials having similar properties might be used if they should become available.

Crosslinked Polyacrylamide polymers and copolymers in general are less biodegradable than the starch based materials as mentioned above; those designed for use in disposable diapers and the like are the most biodegradable. Crosslinked Polyacrylamides also vary in the amount of water they will absorb which in turn reflects the amount of swelling they will undergo, and in the amount of water they can retain over time. This is shown by Wang & Gregg in J. Amer. Soc. Hort Sci. 115(6):943–948 (1990) and demonstrated below. Lot to lot variation has been found also in the various other crosslinked Polyacrylamide copolymers although some might still be suitable for use as lost circulation materials if properly tested before use. The products mentioned above and sold as Broadleaf P4® and Broadleaf P4+ were especially designed to avoid the problems of other crosslinked polyacrylamides and do have a reasonable rate of water absorption, also a high level of water retention and possess resistance to rapid biodegradation. This resistance to biodegradation was illustrated by Johnson, Arab. Gulf J. scient. Res. 3(2) 745–750 (1985). However a swollen cake of those materials can be removed when desired by adding a quantity of dilute hydrochloric acid, acetic acid, certain metallic salts and the like to the well bore whereupon the cake will completely dissolve or disintegrate as shown in the Examples below.

In the practice of the invention, the selected, suitable crosslinked Polyacrylamide copolymer or other suitable water absorbing polymer which will not interfere with the drilling fluid operation or inadvertently biodegrade, is added to the drilling fluid via a hopper or pouring the material by hand from the bag or container or by any other means suitable to adding granular particulate matter. The material is then carried down the borehole where it absorbs water, swells and the swollen material forms a "soft gel" on the fissures. The selection and amount of copolymer to be added to the drilling fluid can readily be adapted to the characteristics of the particular borehole.

Other suitable materials may be mixed with the polymer in an amount equal to or up to 150 times the weight of said polymer and the mixture similarly put into the drilling fluid and allowed to proceed to the borehole. Similarly the materials can be added sequentially to the drilling fluid and allowed to proceed to the borehole. This is illustrated in the Examples.

Such suitable materials may or may not be swellable and may include but are not limited to walnut hulls, cottonseed hulls, thermoset rubber, coal, graphite, other mixed nut shells, perlite, kenaf and the like.

To remove a formed cake of these lost circulation materials in the borehole, a quantity of dilute hydrochloric acid or other suitable acid is added to the drilling fluid in the proper amount necessary to develop the necessary acid strength to dissolve or otherwise cause the destruction of the polymer cake in the borehole. Fifteen percent (15%) hydrochloric acid is convenient to use but the concentration need not be limited to this. Alternatively, solutions of various metallic salts such as sodium chloride, potassium chloride, calcium chloride and the like may be added to the borehole which after contacting the cake will shrink the cake so that it will fragment and be pumped from the borehole.

The following examples are intended only to illustrate the various aspects of the invention which is defined by the claims.

EXAMPLE 1

Determination of the Rate of Water Absorption of Swellable Polymers

The general properties of a polymer suitable for use in this invention are discussed above. This example illustrates a method of determining whether a polymer absorbs water at an appropriate rate, absorbs a useful quantity of water and retains the absorbed water.

Approximately 0.200 gr. samples of the candidate polymers were weighed out and placed in 600 ml beakers. Such polymers comprise a solid, water insoluble polyacrylamide polymer or copolymer, which typically swells from 25–300 times its weight of tap water at room temperature when placed therein. Such polymer may further comprise an alkali metal salt, such as a sodium salt, of a partially hydrolyzed crosslinked polyacrylamide. Then 400 ml of tap water was added and the samples are allowed to stand at room temperature. Periodically over a selected time period of at least 20 hours, the now swollen granules were isolated by pouring the contents of the beakers into a strainer placed upon another beaker of a size sufficient to hold all of the unbound water from the first beaker. The gelled polymers were allowed to drain with mild, intermittent shaking for 5 minutes. The gelled material was then transferred to a previously tared container of size sufficient to hold the entire gelled mass. The containers were then placed on a suitable balance, weighed and the tare weight subtracted from the gross weight. After subtracting the weight of the original dry sample, the net weight was recorded. The gelled samples were returned to their original beakers, the water that had been separated by the strainer was returned and the samples were then allowed to stand for another period of time whereupon this procedure was repeated. This procedure was repeated periodically for 18 hours. The quantity of water absorbed was then calculated as gr. water/gr. sample and the trend of water absorption and/or water desorption can be noticed.

| Water Absorption as Grams Water Absorbed by 1 Gram of Polymer | | |
|---|---|---|
| Sample Description | Polyacrylamide A | Polyacrylamide B |
| Sample Weight | 0.139 gr. | 0.188 gr. |
| gr. water/gr. sample | 162.3 gr. | 127.3 gr. |
| After 1 hour immersion | | |
| After 2 hours | 164.3 gr. | 165.0 gr. |
| After 20 hours | 126.3 gr. | 189.7 gr. |

These results indicate that Polyacrylamide A absorbs water more rapidly than Polyacrylamide B which in this case is the standard grade of Broadleaf P4®. The results also show that after 20 hours the water swollen Polyacrylamide A gave up a considerable amount of its originally absorbed water while Polyacrylamide B did not.

EXAMPLE 2

Determination of the Extent of Swelling in Different water Sources

These determinations were made as in Example 1. The water Sources used were Tap Water and Purchased Distilled Water which is similar to rainwater in dissolved solids content. The samples of crosslinked Polyacrylamides A and B are from the same sources as above.

| | Water Type | | | |
|---|---|---|---|---|
| | Tap | | Distilled | |
| TIME | A | B | A | B |
| 2 hrs. | 164* | 165 | 345 | 346 |
| 20 hrs. | 126 | 189 | 358 | 467 |

*gr. water absorbed per gr. polymer

EXAMPLE 3

Determining Temperature Effect on Swelling of Water Swellable Polymers

One gram (1.0 gr.) of crosslinked Polyacrylamide C was added to 300 ml of tap water at room temperature with stirring by a magnetic stirring device. The mixture was heated on a hot plate. After 35 minutes some gel was noticed and the temperature had reached 80° C.; stirring was not impeded. After a total of 125 minutes the temperature had reached 90° C. and there was the expected amount of swelling as visually observed. The stirring was not impeded until the temperature exceeded 80° C.; stirring was increased and was continued for another 2 hours. With continued stirring the mixture was allowed to return to room temperature and the product resembled polymer that had been swollen at room temperature.

EXAMPLE 4

The procedure of EXAMPLE 3 was repeated using 1.0 gr. of crosslinked Polyacrylamide B (standard Broadleaf P4®) with very similar results.

EXAMPLE 5

Removal of Crosslinked Polyacrylamide Gel or Cake

Three samples of crosslinked Polyacrylamide gel were prepared by adding 1.1 gr. of Broadleaf P4® to 300 ml of tap water-in each of 3 beakers. The beakers were placed on an orbital shaker and shaken moderately until the material had absorbed and swelled until each sample had absorbed ~185 gr. water/1.0 gr. Polyacrylamide which is typical for this product. To one beaker was then added 10 ml. of 0.5 N hydrochloric acid, to another was added 10 ml of 0.1 N hydrochloric acid and to the third was added 1 ml of 5% acetic acid. After 30 minutes the shrinking and/or dissolving of the gel in each sample was noticeable. After 150 minutes, the remaining gel was removed using a strainer and the remaining gel was<25% of the weight of the original amount of gel which had been formed.

EXAMPLE 6

Use of Crosslinked Polyacrylamide B in Conjunction with Treated and Compressed Cottonseed Hulls at Room Temperature Fourteen and seven tenths grams (14.7) of treated and compressed cottonseed hulls (Product PCH from Suprol Management Co.) and 1.0 gr. crosslinked Polyacrylamide B were simultaneously added to 300 ml of tap water at room temperature with stirring. After 25 minutes the cottonseed hulls were observed to be swelling; after another 30 minutes the entire mixture had swollen considerably and the rate of stirring had to be increased. The mixture was heated to 90° C. with no additional apparent change; the swollen particles of the 2 additives were quite compatible and had become intermixed.

EXAMPLE 7

Use of Crosslinked Polyacrylamide B in Conjunction with Treated and Compressed Cottonseed Hulls at Elevated Temperature Experiment 6 was repeated except that the PCH and Polyacrylamide were added simultaneously with stirring to water already at 90° C. After 5 minutes the stirring was slowing and 15 minutes the power on the stirring system had to be increased to maintain movement. After 35 minutes the stirring stopped and the heating was also stopped. In this Experiment, the swollen particles of each additive were distinct from each other.

EXAMPLE 8

Destruction of Mixed Gels or Cakes

The free water in the flask used in Experiment 6 was removed using a strainer. To the residual material was added 200 ml of 15% hydrochloric acid and stirring was started. After 2.5 hours heating was started; after another 1.5 hours, the temperature was 90° C. and the whole appearance of the mixture had changed from that of a jelly-like mass to a slurry of small, powder-like particles. When the slurry was put through a strainer, there were no gel-like particles retained on the strainer.

EXAMPLES 9 & 10

Experiments 7 and 8 were repeated but Polyacrylamide B was replaced with Polyacrylamide C. The results were almost identical.

EXAMPLE 11

Use of Crosslinked Polyacrylamides in Conjunction with Magma Fiber

Magma Fiber is a Lost Circulation Material available from Lost Circulation Specialists Inc., Spring, TX. It is a fiber made when molten rock is extrusion spun.

To 300 ml of tap water with stirring, was added 3.5 gr. of Magma Fiber. After stirring briefly to disperse the fiber, 1.0 gr. of Broadleaf P4® crosslinked Polyacrylamide was added. The stirred mixture was heated and after about 25 minutes the slurry thickened and the rate of stirring was increased to maintain mixing. Shortly thereafter large, swollen globules of Broadleaf P4® having Magma Fibers adhering to and/or trapped therein appeared; the temperature was then 90° C. The stirring was stopped and the mixture was allowed to cool to return to room temperature.

About 100 ml of free water was removed and 200 ml of 15% hydrochloric acid was added and stirring was resumed. After 15 minutes most of the gelled mixture had either dissolved or disintegrated. The mixture was then reheated and in about one hour there was only a hazy, yellow solution; no particles remained.

EXAMPLE 12

Determination of a Preferred Method of Applying the Results of Examples 1 Through 11 in an Operating Oil Well An operating well having a total depth of 7541' was chosen to develop cpreferable operating conditions based on the observations in Examples 1 through 11. The borehole had a 7" casing window at 6246" and an open hole size of 6.125". The well had an open hole volume of 46.8 bbl (1 bbl=42 gal.). A final Lost Circulation Material pill composition of 10 pounds per barrel (ppb) of walnut shells, 10 ppb of mixed flakes and fibers known as Prima Seal and 20 ppb of cotton pellets to which 170 pounds of Broadleaf P4was later added during the trial.

A 70 bbl pill of the above mentioned materials was pumped down the hole at a rate of at least 4 bbl per minute and displaced the mud while the 170 pounds of P4was quickly added during the pumping operation. While the pill was being spotted the maximumreturn seen at the flowline was 25%. The pipe was pulled to above the theoretical top of the pill and 11 barrels was squeezed at a pump rate of 12 strokes per minute. The resulting was squeezes by an amount of force which had bee determined by the geometry, type of substrate formation at the well site, pill pit size and the type of loss which was being experienced.

After 2 hours the drilling assembly was slowly run back to bottom in order to keep the surge pressure on the wellbore to a minimum. Circulation of drilling mud was established with 100% returns of the drilling mud to the surface thus demonstrating the efficiency of P4as a lost circulation material additive.

Previous attempts to gain circulation consisting of the same concentrations of lost circulation material without the P4product being added were not successful.

EXAMPLE 13

Trial of Broadleaf P4+ as a Lost Circulation Material

In a trial similar to that in EXAMPLE 12 was conducted but in this case the loss of drilling fluid was occurring at a depth much further down the borehole than 8000' and Broadleaf P4+ was used in place of the Broadleaf P4.

The rest of the detail is essentially identical to that recited in Example 12. When the drilling assembly was returned to the bottom, circulation of drilling mud was reestablished with 100% of the returns of the drilling mud to thus surface demonstrating in this case that a polymer like Broadleaf P4+ is efficient as a lost circulation additive at borehole depths greater than 8000".

It should be understood that the invention is not necessarily limited to the specific details described above. Changes to certain features and aspects which do not affect the overall basic concepts thereof may be made by those skilled in the art without departing from the spirit and scope of the invention as described in the appended claims.

What is claimed is:

1. A method for reducing the loss of circulation fluids into flow passages of a subterranean formation during well drilling, completion or workover operations, such circulation fluids being selected from the group consisting of drilling fluids, completion fluids and workover fluids said with method comprising:

(a) directly introducing at the well-head into a circulation fluid selected from a group consisting of drilling fluids, completion fluids and workover fluids an effective amount of a dry, solid, water insoluble but gel-forming and water swellable polyacrylamide polymer which has a particle size distribution in the range of about 0.50 millimeters to about 2.5 millimeters and which swells from about 25 to 300 times its weight of tap water when placed therein, and (b) allowing the gel-forming polymer to enter the lost circulation zone and allowing the gel forming polymer to remain in said zone to absorb the aforesaid weight of waxer and swell to the appropriate volume thereby sealing fissures and reducing the loss of said circulation fluid upon resuming well drilling, completion or workover operations.

2. The method of claim 1 wherein the dry, solid, water insoluble but gel-forming and water swellable polymer is a partially hydrolyzed, cross linked polyacrylamide.

3. The method of claim 1 wherein said dry, solid, water insoluble but gel-forming and water swellable polymer is an alkali metal salt of said partially hydrolyzed, crosslinked polyacrylamide.

4. The method of claim 1 wherein the dry, solid, water insoluble but gel-forming and water swellable polymer is the sodium salt of said partially hydrolyzed, crosslinked polyacrylamide.

5. The method of claim 3 wherein the particle size of said salt of said dry, solid, water insoluble but gel-forming polymer is chosen so that the polymer salt reaches the depth of the borehole where it is required before swelling to prevent further loss of said drilling, completion, or workover fluid.

\* \* \* \* \*